US009790973B2

(12) United States Patent
Nisogi

(10) Patent No.: US 9,790,973 B2
(45) Date of Patent: Oct. 17, 2017

(54) FASTENER MEMBER

(71) Applicant: 3M INNOVATIVE PROPERTIES COMPANY, St. Paul, MN (US)

(72) Inventor: Shuhei Nisogi, Tokyo (JP)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 14/433,862

(22) PCT Filed: Oct. 4, 2013

(86) PCT No.: PCT/US2013/063344
§ 371 (c)(1),
(2) Date: Apr. 7, 2015

(87) PCT Pub. No.: WO2014/058717
PCT Pub. Date: Apr. 17, 2014

(65) Prior Publication Data
US 2015/0275941 A1 Oct. 1, 2015

(30) Foreign Application Priority Data
Oct. 11, 2012 (JP) ................ 2012-226221

(51) Int. Cl.
*F16B 1/00* (2006.01)
*A44B 18/00* (2006.01)

(52) U.S. Cl.
CPC .......... *F16B 1/00* (2013.01); *A44B 18/0019* (2013.01); *A44B 18/0042* (2013.01); *A44B 18/0065* (2013.01); *Y10T 403/7045* (2015.01)

(58) Field of Classification Search
CPC ... F16B 1/00; A44B 18/0042; A44B 18/0065; A44B 18/0019; A44B 18/0069;
(Continued)

(56) References Cited

U.S. PATENT DOCUMENTS 3,266,113 A * 8/1966 Flanagan, Jr. ..... A44B 18/0053
24/452
5,242,646 A 9/1993 Torigoe
(Continued)

FOREIGN PATENT DOCUMENTS

CN 201323942 10/2009
JP H09-224720 9/1997
(Continued)

OTHER PUBLICATIONS

International Search Report for PCT International Application No. PCT/US2013/063344 mailed on Dec. 13, 2013, 4 pages.

*Primary Examiner* — Robert J Sandy
*Assistant Examiner* — Rowland Do
(74) *Attorney, Agent, or Firm* — Philip Y. Dahl; Harold Knecht

(57) ABSTRACT

A fastener member (10) including: a base portion (11) having a surface (15); and a plurality of locking members (12) vertically provided on the surface, the locking members locking with a subject to be coupled so as to mechanically couple to the subject to be coupled; wherein the locking member includes a shaft portion (20), projecting from the base portion, having a pair of side faces (22A, 22B) that are opposite each other in a first direction (x) and, as viewed from the surface, diverge in a second direction (y) orthogonal to the first direction, and a barbed portion (21) provided on each of the pair of side faces; and, as viewed from the surface, the barbed portion provided on at least one of the side faces of the pair of side faces extends in a direction intersecting the first direction and the second direction.

19 Claims, 12 Drawing Sheets

(58) Field of Classification Search
CPC . A44B 18/00; A44B 18/0023; A44B 18/0061;
Y10T 403/7045; Y10T 403/24008; Y10T
403/24017; Y10T 24/2792; B29C 43/222
USPC .......................................................... 24/442
See application file for complete search history.

(56) References Cited

U.S. PATENT DOCUMENTS

| | | | |
|---|---|---|---|
| 5,671,512 A | 9/1997 | Hattori | |
| 5,685,050 A * | 11/1997 | Murasaki | A44B 18/0061 24/442 |
| 5,913,482 A * | 6/1999 | Akeno | A44B 18/0049 24/450 |
| 6,066,281 A | 5/2000 | Provost | |
| 6,248,276 B1 | 6/2001 | Parellada | |
| 6,991,843 B2 * | 1/2006 | Armela | A44B 18/0049 428/120 |
| 7,185,401 B2 * | 3/2007 | Ausen | A44B 18/0049 24/442 |
| 7,246,416 B2 | 7/2007 | Duffy | |
| 7,275,290 B2 * | 10/2007 | Clarner | A44B 18/0061 24/452 |
| RE42,475 E * | 6/2011 | Armela | A44B 18/0049 24/442 |
| 8,635,749 B2 * | 1/2014 | Mayers | C09J 7/00 24/304 |
| 8,935,836 B2 | 1/2015 | Picot et al. | |
| 2002/0124359 A1 * | 9/2002 | Murasaki | A44B 18/0049 24/452 |
| 2004/0031130 A1 * | 2/2004 | Clarner | A44B 18/0049 24/452 |
| 2004/0074071 A1 | 4/2004 | Golden | |
| 2005/0115034 A1 * | 6/2005 | Torigoe | A44B 18/0076 24/572.1 |

FOREIGN PATENT DOCUMENTS

| | | |
|---|---|---|
| WO | WO 98/02331 | 1/1998 |
| WO | WO 2012/014667 | 2/2012 |

* cited by examiner

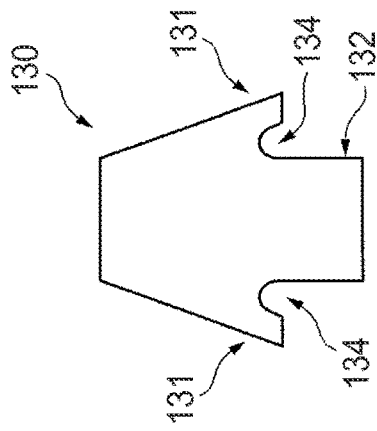
FIG. 11A
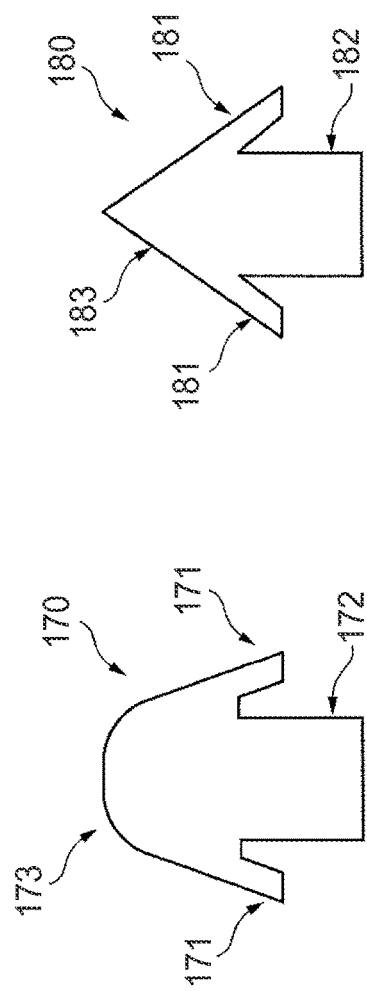
FIG. 11B
FIG. 11C
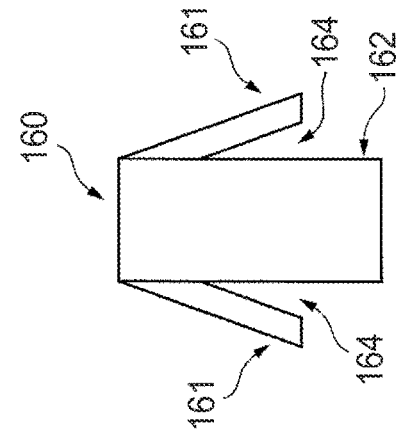
FIG. 11D
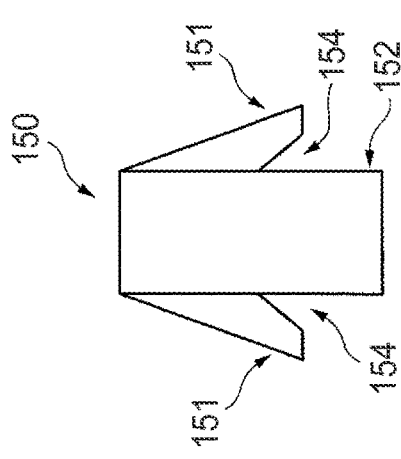
FIG. 11E
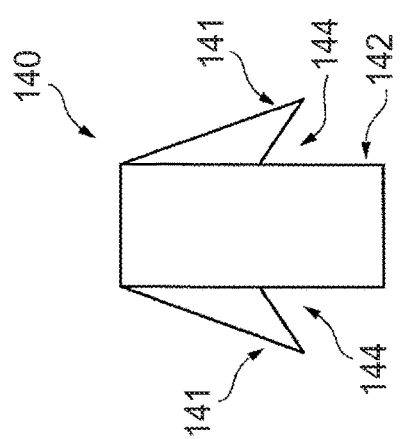
FIG. 11F

FASTENER MEMBER

CROSS REFERENCE TO RELATED APPLICATIONS

This application is a national stage filing under 35 U.S.C. 371 of PCT/US2013/063344, filed Oct. 4, 2013, which claims priority to Japan Application No. 2012-226221, filed Oct. 11, 2012, the disclosures of which are incorporated by reference in their entireties herein.

FIELD OF THE INVENTION

The present invention relates to fasteners, and more particularly to a fastener member.

BACKGROUND

Conventionally, a fastener member is known that includes a base portion having a surface and a plurality of locking members vertically provided on the surface, wherein the locking members, by locking with a subject to be coupled, are mechanically coupled to the subject to be coupled. As this type of technique, a description is given in, for example, Japanese Unexamined Patent Application Publication (Translation of PCT Application) No. H07-509668A for forming a fastener member by injecting a molten material for forming the fastener member into a permanent base portion mold, a destructive detachable leg portion mold, and a permanent head portion mold and allowing to solidify in the molds. This fastener member is removed from the leg portion mold after being removed from the base portion mold and the head portion mold.

SUMMARY OF THE INVENTION

With conventional fastener members, there is a problem in that the production process becomes complicated. Meanwhile, improving the coupling force is required for when the fastener member and the subject to be coupled are coupled. Therefore, it is desirable to provide a fastener member that can be produced in a simple production process and that can exhibit an improved coupling force, with a subject to be coupled.

A fastener member according to one aspect of the present invention is a fastener member including: a base portion having a surface; and a plurality of locking members vertically provided on the surface, the locking members locking with a subject to be coupled so as to mechanically couple to the subject to be coupled; wherein the locking member includes: a shaft portion, projecting from the base portion, having a pair of side faces that are opposite each other in a first direction and, as viewed from the surface, diverge in a second direction orthogonal to the first direction; and a barbed portion provided on each of the pair of side faces; and, as viewed from the surface, the barbed portion provided on at least one of the side faces of the pair of side faces extends in a direction intersecting the first direction and the second direction.

According to this aspect of the present invention, the barbed portion provided on the side face that faces in the first direction of the shaft portion extends, as viewed from the surface, in a direction intersecting the first direction and the second direction. Because the barbed portions extend having directional components of both the first direction and the second direction in this manner, the range that can be coupled to the subject to be coupled can be widened. By doing so, locking with the subject to be coupled becomes easier for each single locking member allowing an increase in the locking members that lock with the subject to be coupled in the fastener member, thus improving the coupling force of the overall fastener member. Further, even if the barbed portions have a directional component of both the first direction and the second direction, because they extend from the side face opposing the first direction, a slide mold that moves in the second direction can be used to form the side face. Because the locking member can be produced using a single slide direction in this manner, the production process can be easier. According to the above, the fastener member can be produced in a simple production process and can improve the coupling force with a subject to be coupled.

In a fastener member according to another aspect of the present invention, a plurality of barbed portions may be provided on at least one side face.

In the fastener member according to another aspect of the present invention, a recess may be formed on the surface side of the barbed portion to hook the subject to be coupled.

In the fastener member according to another aspect of the present invention, the locking member may be disposed in a lattice-like manner as viewed from the surface.

In the fastener member according to another aspect of the present invention, the barbed portion may have a portion that extends in the second direction more than the shaft portion.

In the fastener member according to another aspect of the present invention, each of the barbed portions provided on the pair of side faces may be provided so as to be symmetrical around the shaft portion.

The present invention can provide a fastener member having an improved coupling force, with a subject to be coupled, and that can be produced in a simple production process.

BRIEF DESCRIPTION OF THE DRAWINGS

FIG. 11A-11F illustrate various configurations of the locking members of the fastener member according to a modified example as viewed in the Y direction.

DETAILED DESCRIPTION

Figure 1:
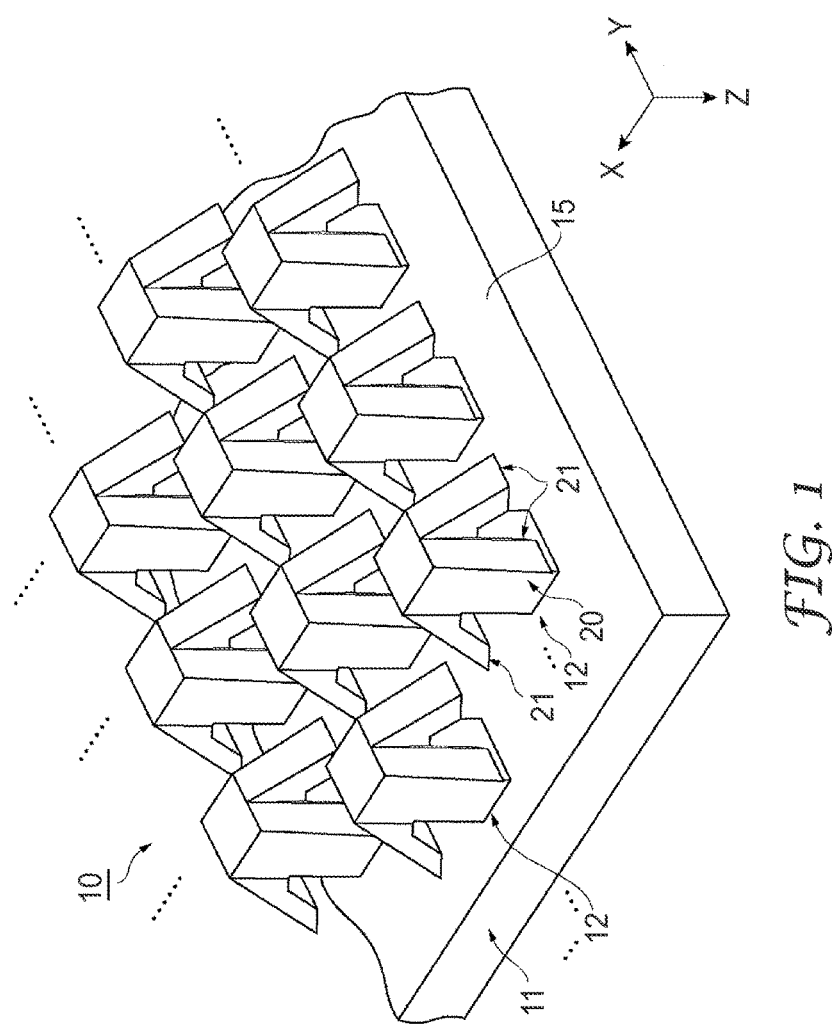
FIG. 1 is a perspective view illustrating a fastener member according to an embodiment.

Embodiments of the present invention are described below in detail while referring to the drawings. In the following description, the same or corresponding elements are given the same reference numeral, and duplicate explanations are omitted. Further, the terms "X direction," "Y direction," and "Z direction" are terms of convenience based on directions illustrated in the drawing.

Figure 3:
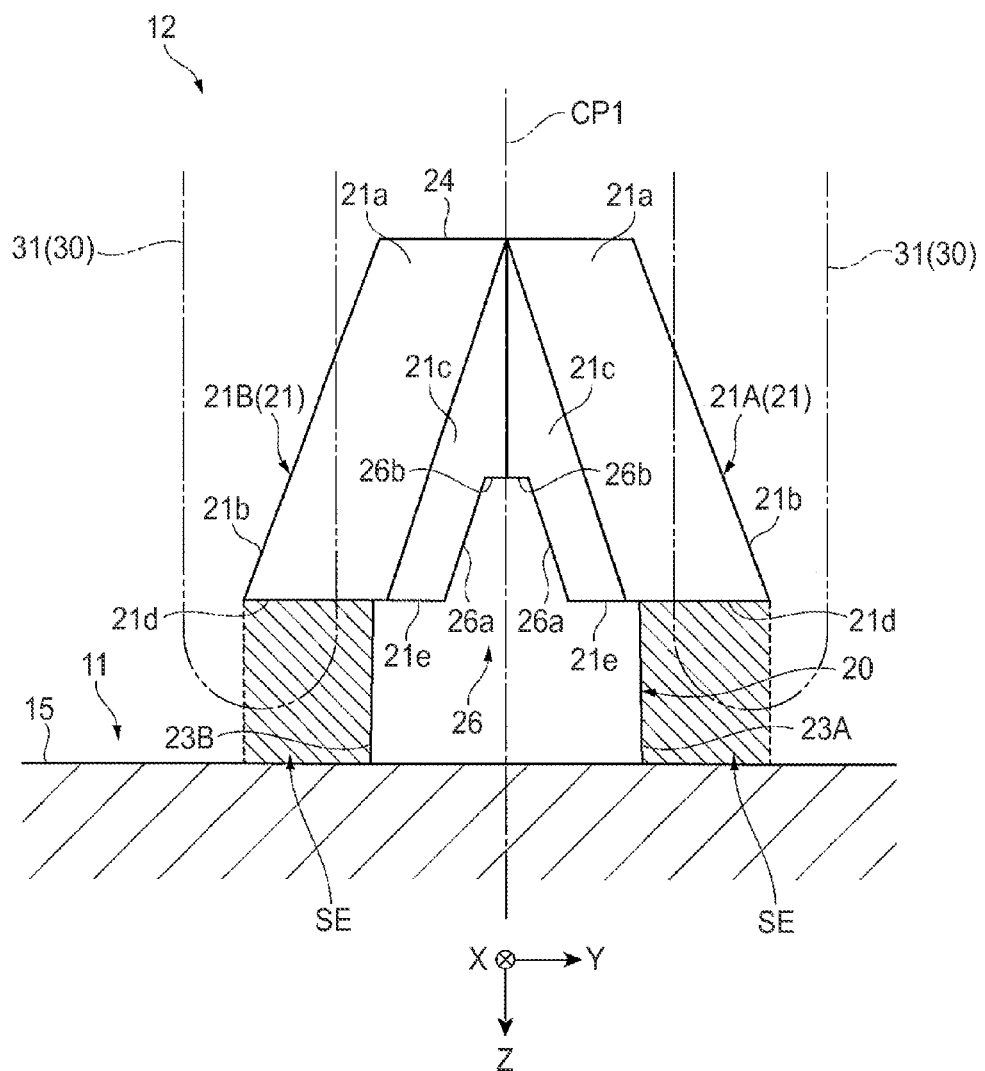
FIG. 3 illustrates a configuration of the locking members of the fastener member as viewed in the X direction.

As illustrated in FIG. 1, a fastener member 10 of this embodiment is used to secure, for example, an interior panel of a vehicle and configures a face-to-face locking type surface fastener. The fastener member 10 here is used as a hook member that engages and mechanically couples with a subject to be coupled (for example, a loop member 30 as illustrated in FIG. 3) which is a counter side to coupling. Note that the loop member 30, which is the subject to be coupled, corresponds to the female side of the surface fastener and is configured having a plurality of loop yarns 31, projecting from the surface of the base portion such that the loop yarns 31 extend in an annular shape, and locks by hooking onto the locking members 12 at the time of coupling. This type of loop member 30 is affixed to, for example, a member on the vehicle body side of the vehicle either directly or via a bracket, tape, adhesive, or the like.

The fastener member 10 corresponds to the male side of the surface fastener and is one-piece molded out of a resin material. The fastener member 10 is provided with a base portion 11 and a plurality of locking members 12 vertically provided on the base portion 11.

The base portion 11 is, for example, a plate-like shape having a substantially flat planar surface 15. This type of base portion 11 is affixed to, for example, a member on an interior panel side either directly or via a bracket, tape, adhesive, or the like. In this embodiment, the surface 15 diverges in the X direction and the Y direction. Note that the shape of the base portion 11 is not particularly limited and the surface 15 also may not be perfectly flat and may have a partially raised section, inclination, or the like.

The locking members 12 are provided so as to stand from the surface 15 in the Z direction and are arranged by aligning in a lattice-like manner with a predetermined distance as viewed from the surface (as viewed in the Z direction). Note that a description of aspects of the alignment of the locking members 12 will be given below. The locking member 12 is provided with a shaft portion 20 that extends from the surface 15 in the Z direction and a barbed portion 21 provided on the tip end side of the shaft portion 20.

Figure 4:
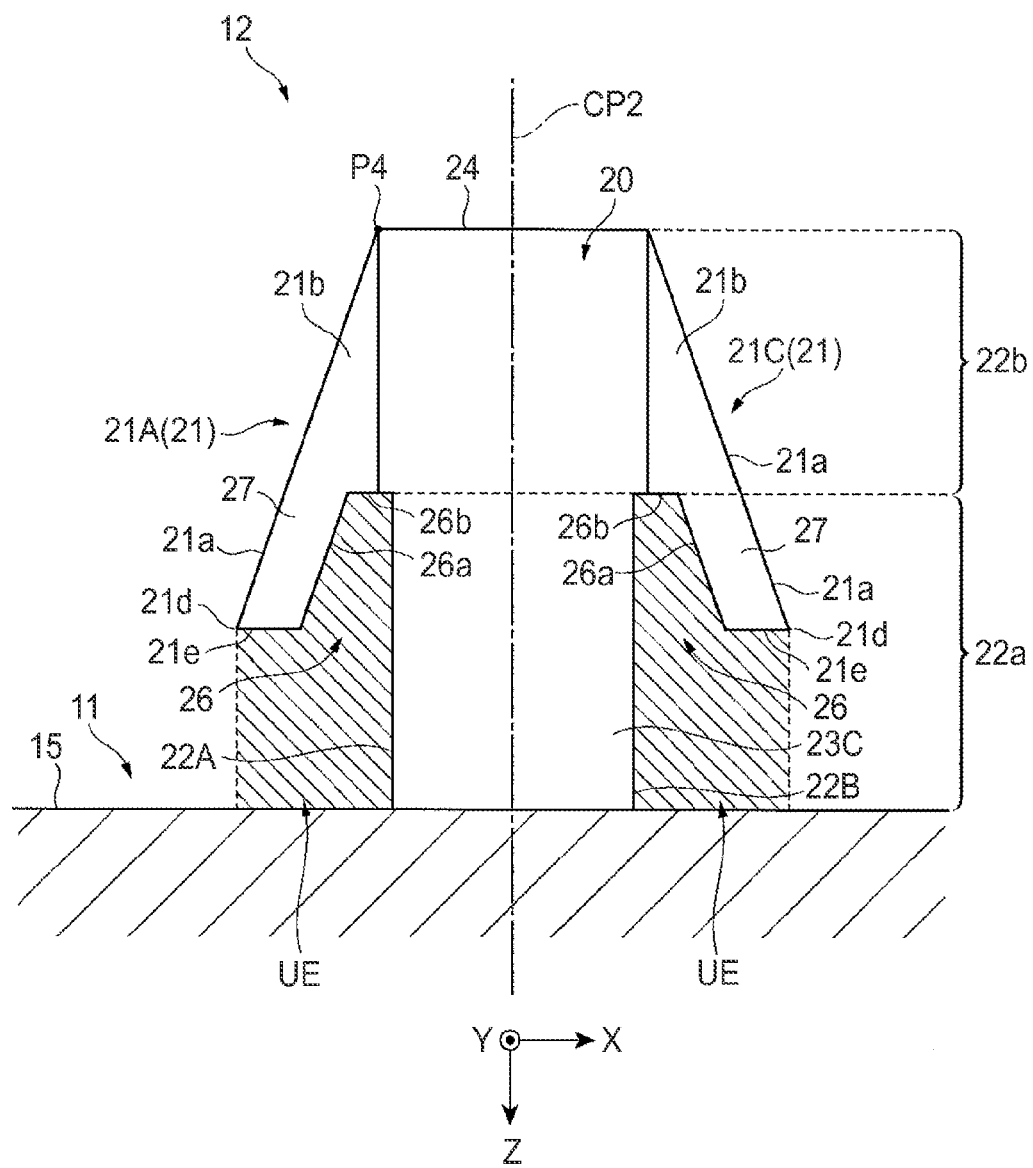
FIG. 4 illustrates a configuration of the locking members of the fastener member as viewed in the Y direction.

A configuration of the locking members 12 will be described in detail with reference to FIGS. 2 to 4. The locking member 12 is a portion formed by injection molding using a slide mold that moves in the Y direction and a second mold that moves relatively in the Z direction relative to the locking member 12. Of the shapes of the locking member 12, the external shape (shape illustrated in FIG. 2) as viewed in the Z direction and the shape of the upper side region (of the shapes illustrated in FIGS. 3 and 4, the shape of the region that can be identified by viewing from above, i.e. the shape of the region identifiable in FIG. 2) is formed by the second mold. Of the shapes of the locking member 12, the lower end region, i.e. the shape of the undercut portion UE (the hatched region in FIG. 4) submerged to the inner side more than the external shape as viewed in the Z direction, is formed by only the slide mold that moves in one direction. Note that the hatched region in FIG. 3 illustrates a submerged portion SE submerged into the inner side as viewed in the X direction, and the submerged portion SE is a part of a region of the undercut portion UE (in FIG. 3, the entire undercut portion UE is not hatched but only the submerged portion SE is hatched, for facilitating understanding). The submerged portion SE is formed at the same time that the undercut portion UE is formed by only the slide mold that moves in one direction. Note that, in the following description, a virtual plane orthogonal to the Y direction will be called "reference plane CP1" and a virtual plane orthogonal to the X direction will be called "reference plane CP2." Further, the X direction will correspond to the "first direction" described in the aspect, and the Y direction will be the "second direction" given in the aspect.

The shaft portion 20 is a substantially rectangular columnar shaped member that projects in a direction orthogonal to the surface 15 (Z direction) from the surface 15. The shaft 20 has a plane-symmetrical configuration through the reference plane CP1 as viewed in the X direction, and it has a plane-symmetrical configuration through the reference plane CP2 as viewed in the Y direction. In other words, the reference plane CP1 becomes a central plane as viewed in the X direction (direction illustrated in FIG. 3) of the shaft portion 20, and the reference plane CP2 becomes a central plane as viewed in the Y direction (direction illustrated in FIG. 4). The dimensions in the X direction and in the Y direction of the shaft portion 20 are set to from approximately 0.2 to approximately 2.0 mm or to from approximately 0.4 to approximately 1.2 mm, and the dimensions in the Z direction are set to from approximately 0.7 to approximately 3.0 mm or to from approximately 1.2 to approximately 2.3 mm.

Figure 2:
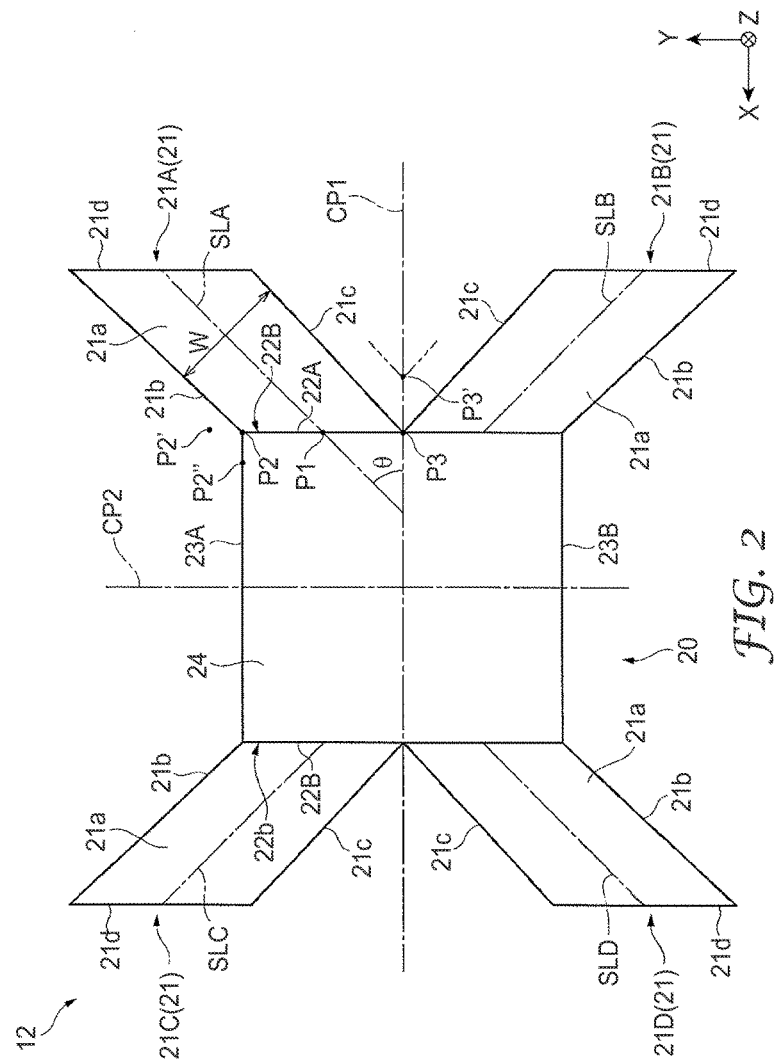
FIG. 2 illustrates a configuration of locking members of the fastener member as viewed in the Z direction.

The shaft portion 20, as viewed in the Z direction, has a pair of side faces 22A and 22B that are opposite each other in the X direction and that diverge in the Y direction (see FIG. 2). In this embodiment, the side faces 22A and 22B are formed by planes that diverge so as to become parallel in the Y direction as viewed in the Z direction. The side faces 22A and 22B have a base end region 22*a* that becomes a plane parallel to the reference plane CP2 on the surface 15 side, and a tip end region 22*b* that becomes a plane parallel to the reference plane CP2 on the tip end side. The tip end region 22*b* is disposed more to the outer side relative to the reference plane CP2 than the base end region 22*a*.

The base end region 22*a* is a region on the side faces 22A and 22B formed by the slide mold at the time of molding. The tip end region 22*b* is a region on the side faces 22A and 22B formed by the second mold at the time of molding. Note that, in this embodiment, because the barbed portions 21 are formed in substantially the entire region of the tip end region 22*b*, the side faces 22A and 22B on the tip end region 22*b* become virtual planes in a boundary portion between the shaft portion 20 and the barbed portion 21. As long as the side faces 22A and 22B can be formed by a molding method using the slide mold and the second mold (detailed description given below), they may be formed in any shape. For example, the base end region 22*a* and the tip end region 22*b* may be formed on the same plane. For example, the side faces 22A and 22B on the base end region 22a may be on a flat plane or curved plane that inclines in a tapered shape as viewed in the Y direction (direction illustrated in FIG. 4). Further, for example, the side faces 22A and 22B on the tip end region 22b may be a shape that curves to the outer side or to the inner side as viewed in the Z direction (direction illustrated in FIG. 2).

The shaft portion 20, as viewed in the Z direction, has a pair of side faces 23A and 23B that are opposite each other in the Y direction and that diverge in the X direction (see FIG. 2). In this embodiment, the side faces 23A and 23B are formed by planes that become parallel in the X direction as viewed in the Z direction and by planes that become nearly parallel in the Z direction. The side faces 23A and 23B are portions formed by the second mold at the time of molding. As long as the side faces 23A and 23B can be formed by the second mold, they may be formed in any shape. For example, the side faces 23A and 23B may be a shape that curves to the outer side or to the inner side as viewed in the Z direction (direction illustrated in FIG. 2).

The shaft portion 20 has a tip end face 24 that opposes the surface 15 and that widens in the XY direction. In this embodiment, the tip end face 24 widens so as to be parallel to the surface 15. The tip end side face 24 is a portion formed by the second mold at the time of molding. As long as the tip end face 24 can be formed by the second mold, it may be formed in any shape, and a modified example will be described below in detail.

The barbed portion 21 is formed on each of the pair of side faces 22A and 22B that face each other in the X direction. The barbed portion 21 extends in a direction intersecting the X direction and the Y direction as viewed in the Z direction. In other words, the extension direction of the barbed portion 21 is not configured of a directional component of only one of either the X direction component or the Y direction component but is configured of directional components of both the X direction component and the Y direction component. Further, the barbed portion 21 extends so as to widen to the outer side from the shaft portion 20 as it approaches the surface 15 as viewed in the Y direction. The barbed portion 21 extends downward to the outer side from the tip end region 22b of the side faces 22A and 22B forming a strip. Further, when forming the undercut portion UE below the barbed portion 21, a space is formed between a portion of a lower end side (surfaced 15 side) of the barbed portion 21 and the surface 15 of the base portion 11. When the loop yarn 31 of the loop member 30 is inserted into the space, it hooks with the barbed portion 21 and is locked. Further, the barbed portion 21 is provided in a plurality on each of the side faces 22A and 22B. In this embodiment, barbed portions 21A and 21B are formed on the side face 22A, and barbed portions 21C and 21D are formed on the side face 22B such that four barbed portions 21 are formed on one locking member 12.

First, with reference to FIG. 2, a configuration of the barbed portions 21 as viewed in the Z direction will be described. Note that, as illustrated in FIG. 2, in order to describe the configuration of the barbed portions 21A to 21D, shaft lines SLA to SLD are established relative to the barbed portions 21A to 21D as viewed in the Z direction. The shaft lines SLA to SLD are lines that extend in the extension direction of the barbed portions 21A to 21D and are defined by a central position in the width W of the barbed portions 21A to 21D.

The barbed portion 21A is provided on a region of the side face 23A side (a region of the top right surface of the paper in FIG. 2) in the side face 22A of the shaft portion 20. The barbed portion 21A extends toward the outer side in the X direction from the side face 22A so as to retreat from the reference plane CP1 toward the outer side in the Y direction. Specifically, the starting point P1 of the shaft line SLA of the barbed portion 21A is set in a substantially central position between the reference plane CP1 and the side face 23A, of the side face 22A, and the shaft line SLA is set so as to extend from the starting point P1 in a direction that inclines at a predetermined angle θ with respect to the reference plane CP1. In this embodiment, the predetermined angle θ is set at 45°, but the angle may be set to any angle within a range of from approximately 0° to approximately 65°, or from approximately 35° to approximately 53°.

The side faces 21b and 21c in the width direction of the barbed portion 21A extend along the shaft line SLA. In other words, the side faces 21b and 21c extend toward the outer side in the X direction so as to retreat from the reference plane CP1 toward the outer side in the Y direction. Note that the side face 21b and 21c become substantially parallel in the Z direction (there is a slight incline in the Z direction because a draft is required). Specifically, the starting point P2 of the side face 21b on the outer side in the Y direction is set in a corner portion between the side face 22A and the side face 23A, and the side face 21b extends from the starting point P2 so as to become parallel with the shaft line SLA. Note that, because the predetermined angle θ is 45°, the side face 21b comes to be disposed on a diagonal of the shaft portion 20. Further, the starting point P3 of the side face 21c on the inner side in the Y direction is set in a central position (on the reference plane CP1) in the Y direction of the side face 22A, and the side face 21c extends from the starting point P2 so as to become parallel with the shaft line SLA. The dimension of the width W of the barbed portion 21A is set to from approximately 0.2 to approximately 1.0 mm, or from approximately 0.2 to approximately 0.5 mm. The end portion 21d of the barbed portion 21A becomes parallel to the Y direction. However, the shape of the end portion 21d is not limited, and modified examples will be described below. The protrusion amount (here, a distance between the side face 22A and the end portion 21d) in the X direction of the barbed portion 21A is set to from approximately 0.2 to approximately 1.0 mm, or from approximately 0.2 to approximately 0.5 mm.

According to the configuration such as that given above, the barbed portion 21A has a portion that extends more in the Y direction than the shaft portion 20 as viewed in the Z direction. In other words, the barbed portion 21A has a portion that extends more to the outer side in the Y direction than the side face 23A of the shaft portion 20. Further, on a region of the lower side of that portion, the submerged portion SE is formed submerged into the inner side as viewed in the X direction (see FIG. 3). Because a portion (or even the entirety) of the end portion 21d of the barbed portion 21A is disposed more to the outer side in the Y direction than the side face 23A of the shaft portion 20, the loop yarn 31 of the loop member 30 that exists more to the outer side in the Y direction than the shaft member 20 can also be hooked by the barbed portion 21A (see FIG. 3).

Note that, to secure ease in molding, the starting point P2 of the side face 21b is set in the corner portion of the shaft portion 20, but the set position is not particularly limited, and it may be set in a position on the inner side in the Y direction of the side face 22A, it may be set in a position more to the outer side in the Y direction than the side face 22A (for example, the starting point P2' illustrated in FIG. 2), or it may be set in a position near the corner portion in the side face 23A (for example, the starting point P2" illustrated in FIG. 2). Further, the starting point P3 of the side face 21c may also be set in any of the positions of the side face 22A, or it may be set in a position that intersects with the barbed portion 21B neighboring the barbed portion 21A (for example, the starting point P3' illustrated in FIG. 2). Furthermore, the side faces 21b and 21c extend in parallel to the shaft line SLA, but they may extend broadly in width toward the outer side in the X direction, or they may extend so as to taper. Broadening the width within a range that does not compromise the ease of locking with the loop yarn 31 of the loop member 30 enables the strength of the tip end side of the barbed portion 21A to be secured. Tapering within a range that enables strength to be secured improves the ease of locking between the barbed portion 21A and the loop yarn 31 of the loop member 30. Note that the shape of the barbed portion 21 as viewed in the Z direction may be any shape that can be formed by the second mold, and a modified example will be described below in detail.

In the side face 22A, the barbed portion 21B adjacent in the Y direction to the barbed portion 21A has a plane-symmetrical configuration with the barbed portion 21A relative to the reference plane CP1. By this, in the region of the side face 23B side in the side face 22A of the shaft portion 20 (the region in the bottom right of the surface of the paper in FIG. 2), the barbed portion 21B extends from the side face 22A toward the outer side in the X direction so as to retreat from the reference plane CP1 to the outer side in the Y direction. However, the barbed portion 21A and the barbed portion 21B do not require plane-symmetry and may be made in mutually different shapes.

The barbed portions 21C and 21D provided on the side face 22B are provided so as to be symmetrical with the barbed portions 21A and 21B around the shaft portion 20. In other words, the barbed portions 21C and 21D have a plain-symmetrical configuration with the barbed portions 21A and 21B relative to the reference plane CP2. By this, in the region of the side face 23A side in the side face 22B of the shaft portion 20 (the region in the top left of the surface of the paper in FIG. 2), the barbed portion 21C extends from the side face 22B toward the outer side in the X direction so as to retreat from the reference plane CP1 to the outer side in the Y direction. In the region of the side face 23B side in the side face 22B of the shaft portion 20 (the region in the bottom left of the surface of the paper in FIG. 2), the barbed portion 21D extends from the side face 22B toward the outer side in the X direction so as to retreat from the reference plane CP1 to the outer side in the Y direction. However, the barbed portions 21A and 21B and the barbed portion 21C and 21D do not require plane-symmetry and may be made in mutually different shapes.

Next, with reference to FIG. 4, a configuration of the barbed portions 21A to 21D as viewed in the Y direction will be described. As illustrated in FIG. 4, the barbed portion 21A is linked to the shaft portion 20 in the tip end region 22b of the side face 22A. The barbed portion 21A extends to the surface 15 side so as to incline with respect to the Z direction, and it extends so as to retreat from the side face 22A of the shaft portion 20 approaching the surface 15. An inclined face 21a on the outer side of the barbed portion 21A extends from the tip end face 24 side of the shaft portion 20 toward the surface 15 side so as to retreat from the side face 22A of the shaft portion 20. The inclined face 21a diverges in parallel in the Y direction and is configured by an inclined plane in this embodiment. Specifically, the inclined face 21a has a starting point P4 set in a corner portion between the tip end face 24 and the side face 22 and extends directly to the surface 15 side so as to incline to the outer side in the X direction from the starting point P4. The dimension in the Z direction of the barbed portion 21A, i.e. the dimension in the Z direction between the top end of the inclined face 21a (here, the same position as the tip end face 24) and the end portion 21d of the lower side of the inclined face 21a is set to from approximately 0.3 to approximately 2.0 mm, or from approximately 0.5 to approximately 1.5 mm. Note that the shape of the inclined face 21a as viewed in the Y direction may be any shape that can be molded by the second mold and may include a shape that curves to the outer side or to the inner side. Further, the starting point P4 may also be formed in any position on the tip end region 22b of the side face 22. Moreover, an R shape may be formed between the inclined face 21a and the tip end face 24.

A recess 26 for hooking the loop yarn 31 of the loop member 30 is formed in the surface 15 side of the barbed portion 21A. The recess 26 is configured by a groove that extends in parallel in the Y direction in a predetermined shape relative to the lower side region of the surface 15 side of the barbed portion 21A. The recess 26 is a part of the undercut portion UE formed by the slide mold that moves in the Y direction. In this embodiment, a lower end face 21e extends to the side face 22A of the shaft portion 20 from the end portion 21d of the inclined face 21a, and the recess 26 is formed relative to the lower end face 21e. The recess 26 is configured of the side face 22A on the base end region 22a of the shaft portion 20, an inclined face 26a that faces the inclined face 21a of the outer side, and a linked face 26b where the top end portion of the inclined face 26a and the side face 22A are linked.

The inclined face 26a is formed so as to be substantially parallel to the inclined face 21a of the outer side, and the bottom end portions of each of the inclined faces 21a and 26a are linked by the lower end face 21e. Therefore, a claw portion 27 having a thinner thickness compared to the portion corresponding to the tip end region 22b is formed on the tip end side of the barbed portion 21A. Forming the claw portion 27 allows the loop yarn of the loop member 30 to be more easily hooked by the recess 26 of the barbed portion 21A. The thickness T of the claw portion 27 is set to from approximately 0.15 to approximately 0.4 mm. The dimension in the Z direction of the claw portion 27, i.e. the dimension in the Z direction between the linked face 26b and the lower end face 21e is set to from approximately 0.1 to approximately 0.8 mm. Note that the lower end face 21e and the linked face 26b both become planes parallel to the surface 15. By setting the claw portion 27 to such a dimension, the loop yarn of the loop member 30 can be easily hooked in addition to also securing sufficient strength.

Note that, because the lower end region (the lower end face 21, the inclined face 26a, and the linked face 26b) of the barbed portion 21A is formed by the slide mold at the time of molding, the shape may be any shape that can be molded by the slide mold, and a modified example will be given in detail hereinafter.

The barbed portion 21B, as described above, becomes a plane-symmetrical configuration with the barbed portion 21A relative to the reference plane CP1. Further, the barbed portions 21C and 21D provided on the side face 22B are provided so as to be symmetrical with the barbed portions 21A and 21B around the shaft portion 20 to make a plane-symmetrical configuration with the barbed portions 21A and 21B relative to the reference plane CP2. Accordingly, the barbed portion 21B, as viewed in the Y direction, becomes the same shape as the barbed portion 21A, and the barbed portions 21C and 21D become a plane-symmetrical shape relative to the reference plane CP2 with the barbed portions 21A and 21B. Further, the barbed portion 21C, as viewed in the X direction, becomes the same shape as the barbed portion 21A, and the barbed portion 21D becomes the same shape as the barbed portion 21B (see FIG. 3). Note that, as described above, the barbed portion 21A and the barbed portion 21B do not require plane-symmetry and may be made in mutually different shapes. Further, the barbed portion 21A and the barbed portion 21C do not require plane-symmetry and may be made in mutually different shapes. Furthermore, the barbed portion 21B and the barbed portion 21D do not require plane-symmetry and may be made in mutually different shapes.

The fastener member 10 according to this embodiment is produced using a predetermined mold structure. The fastener member 10 is produced by injection molding using a first mold that forms a shape of the upper side in the Z direction, a second mold that forms a shape of a lower side in the Z direction, and a slide mold. The slide mold is used to form the undercut portion UE of the barbed portion 21 of the locking member 12 and can slide in the Y direction.

Combining the first mold, the second mold, and the slide mold as described above allows an inner space that corresponds to the shape of the fastener member 10 to be formed and for resin to be injected into the inner space. For example, applicable resins include polyester-based, polyolefin-based, polyamide-based, polyurethane-based, polyether-based, acrylic-based, polycarbonate-based, and styrene-based resins. After the resin has cooled and solidified, the first mold is moved in the Z direction (or the second mold is moved in the Z direction) and the slide mold is moved in the Y direction to release the slide mold. Doing this allows the molded fastener member 10 to be removed.

As described above, a slide mold that moves in a plurality of directions is not required and molding is possible using only a slide mold that moves in one direction. Because the locking members 12 cannot be formed in a position where the slide mold passes through, the molding positions of the locking members 12 are restricted when using a multi-directional slide mold, but in this embodiment, because only a single directional slide mold is used, the molding positions of the locking members 12 are not restricted and can be formed in high density.

Figure 5:
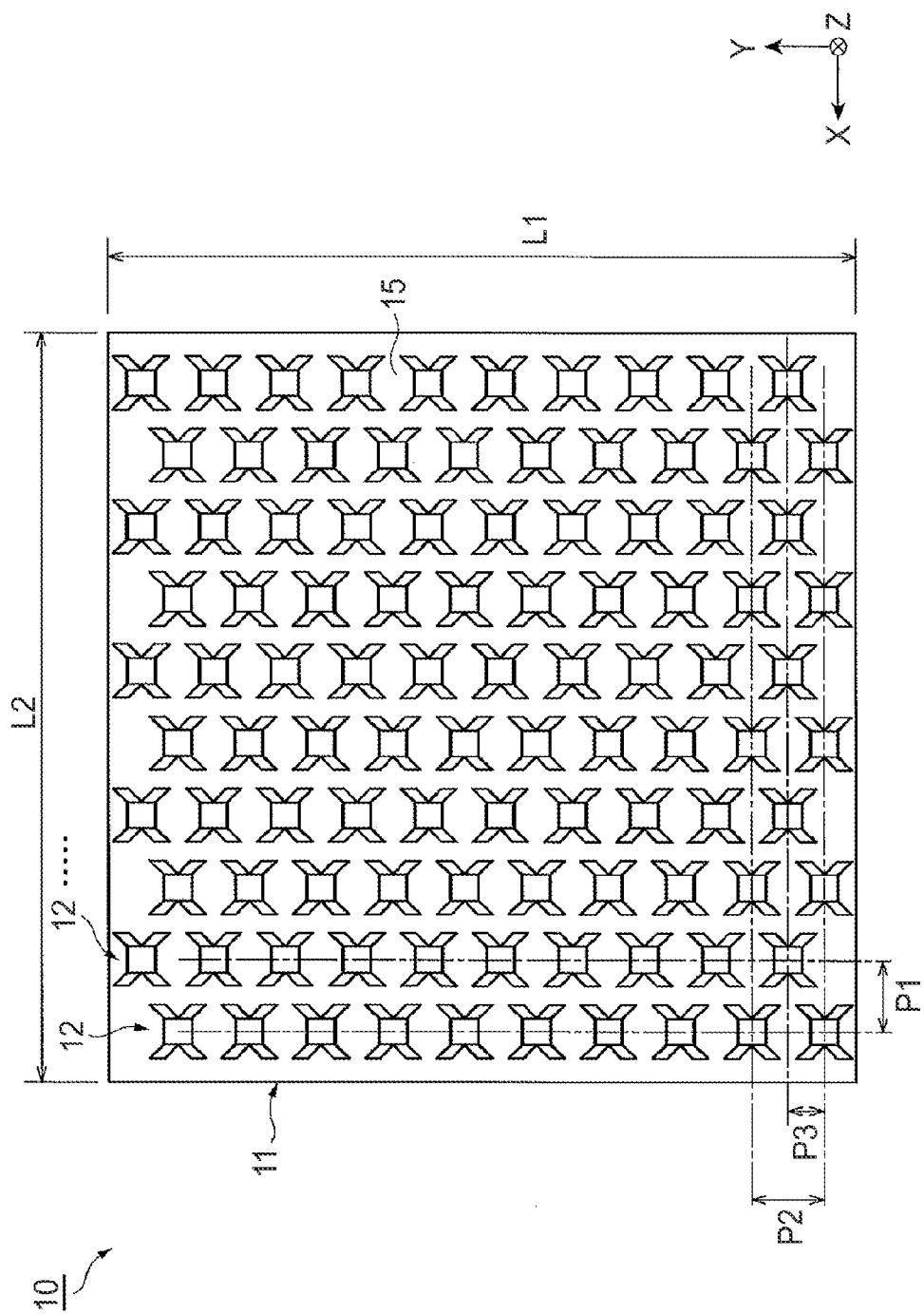
FIG. 5 illustrates one example of an array structure of the locking members of the fastener member.
Figure 6:
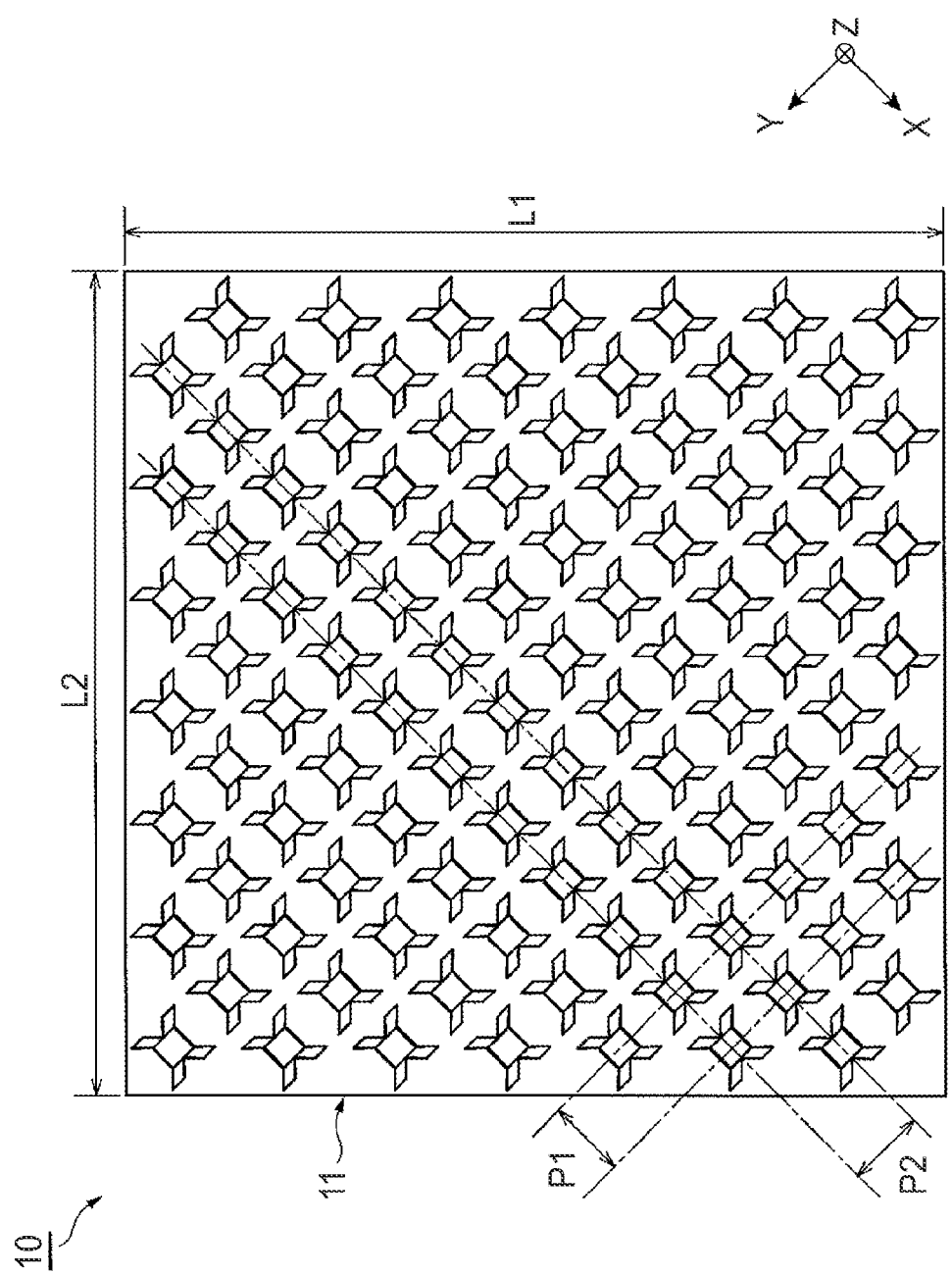
FIG. 6 illustrates one example of an array structure of the locking members of the fastener member.

Next, an array configuration of the locking members 12 will be described while referencing FIGS. 5 and 6. With the fastener member 10 according to this embodiment described above, the locking members 12 can be formed in a high density on the base portion 11. Therefore, as illustrated in FIGS. 5 and 6, it is possible for the locking members 12 to be disposed in a lattice-like manner as viewed in the Z direction. The size (dimensions indicated by L1 and L2 in the drawing) of each side of the base portion 11 illustrated in FIGS. 5 and 6 are set to from approximately 5 to approximately 400 mm (the length may be as long as desired as long as it fits in the mold). Note that here, L1 and L2 are the same dimensions, but different dimensions are also possible.

In the example illustrated in FIG. 5, each side of the base portion 11 is parallel to either the X direction or the Y direction. The locking members 12 are disposed so as to form a linear row at a constant pitch in the Y direction, and a plurality of rows are aligned at a constant pitch in the X direction. Further, the positions in the Y direction for the locking members 12 associated with one row and the locking members 12 associated with an adjacent row are arranged so as to be mutually offset. Accordingly, the locking members 12 are configured so as to be disposed in a staggered shape in the X direction. As many locking members 12 as possible are disposed relative to the size L1 of the side of the base portion 11 in the Y direction, and as many locking members 12 as possible are disposed relative to the size L2 of the side of the base portion 11 in the X direction. In other words, a plurality of locking members 12 are disposed from a first edge portion of the surface 15 of the base portion 11 until arriving at an opposite second edge portion. Therefore, the locking members 12 are formed across the entire region of the surface 15 of the base portion 11 in such a pattern. The pitch between each row (the dimensions indicated by P1 in the drawing) is set to from approximately 1.0 to approximately 3.0 mm (the length may be as long as can fit in the mold). Further, the pitch of the locking members 12 per each row (the dimension indicated by P2 in the drawing) is set to from approximately 1.0 to approximately 3.0 mm (the length may be as long as can fit in the mold). Note that the width of the staggered arrangement in the X direction (the dimension indicated by P3 in the drawing) can be set to half of the pitch (P2/2) of the locking members 12 for each row.

In the example illustrated in FIG. 6, each side of the base portion 11 is inclined at 45° relative to either the X direction or the Y direction. The locking members 12 are disposed so as to form a linear row at a constant pitch in the Y direction (a first diagonal direction of the base portion 11), and a plurality of rows is aligned at a constant pitch in the X direction (a second diagonal direction of the base portion 11). Note that the positions in the Y direction for the locking members 12 associated with one row and the locking members 12 associated with an adjacent row are arranged so as to match. Accordingly, the locking members 12 are configured so as to be disposed in a linear shape in the X direction. Because each side of the base portion 11 is inclined at 45° relative to the XY direction, the number of locking members 12 in each row differs depending on the position in the X direction. In each row, as many locking members 12 as possible are disposed relative to the size in the first diagonal direction of the base member 11. In other words, a plurality of locking members 12 is disposed from the first edge portion of the surface 15 of the base portion 11 until arriving at the second edge portion opposing the diagonal direction. Therefore, the locking members 12 are formed across the entire region of the surface 15 of the base portion 11 in such pattern. The pitch between the rows (the dimensions indicated by P1 in the drawing) and the pitch of the locking members 12 per row (the dimensions indicated by P2 in the drawing) can be set to be equivalent to the dimensions given in the example of FIG. 5. Note that the arrangement of the locking members 12 is not limited to the example described above and all arrangements that can be formed are possible as long as the locking members 12 avoid regions where the slide mold that moves in the Y direction passes through.

Next, the action and effect of the fastener member 10 according to this embodiment will be described.

Figure 7A:
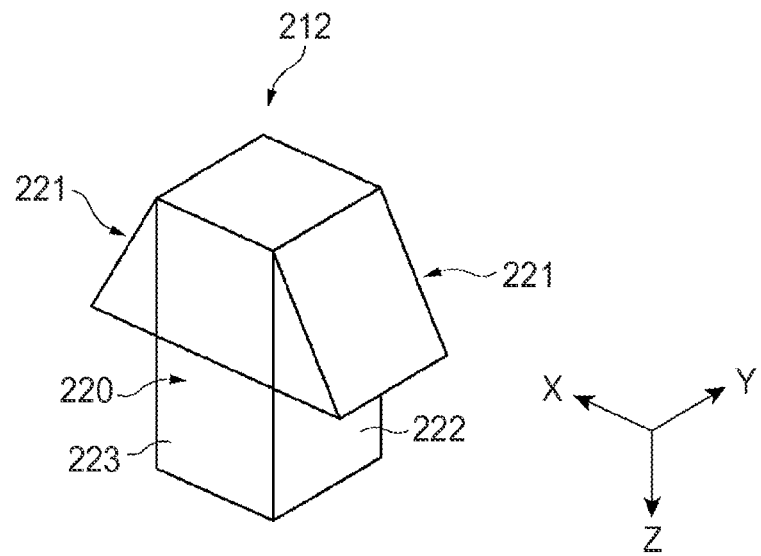
FIG. 7A is a perspective view of the locking member of the fastener member according to a comparative example.
Figure 7B:
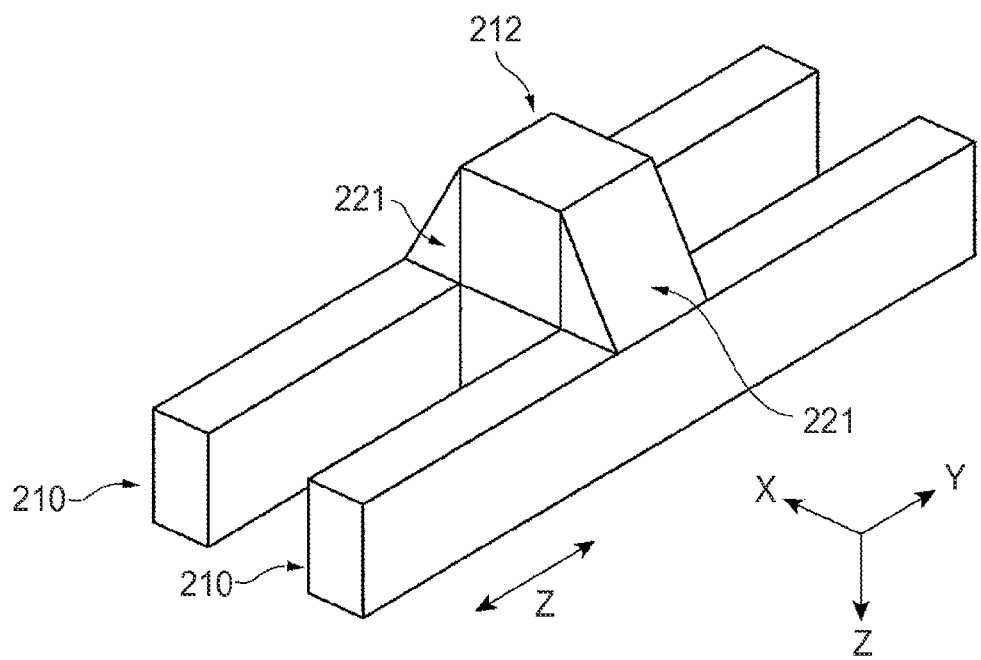
FIG. 7B is a perspective view illustrating a mold structure for producing the locking member illustrated in FIG. 7A.

First, a fastener member according to a comparative example will be described with reference to FIGS. 7 to 9. Locking members 212 of the fastener member illustrated in FIG. 7 are provided with barbed portions 221 that extend only in the X direction from the side face 222 that opposes the X direction of the shaft portion 220. The barbed portion 221 of this type of locking member 212 can be formed by a slide mold 210 that moves in the Y direction. With this type of locking member 212, the loop yarn 31 of the loop member 30, which is the subject to be coupled, if residing in an adjacent position in the X direction to the locking member 212, can be hooked by the barbed portion 221, but, if residing in an offset position in the Y direction relative to the shaft portion 220, it cannot be hooked by the barbed portion 221. Furthermore, because the barbed portion 221 extends only in the X direction, the loop yarn 31 may not be sufficiently hooked depending on the orientation of the loop yarn 31 of the loop member 30.

Figure 8A:
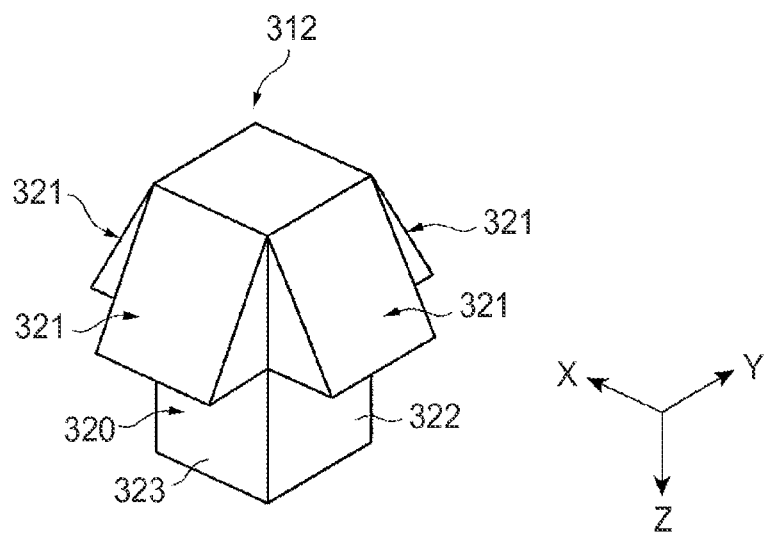
FIG. 8A is a perspective view of the locking member of the fastener member according to a comparative example.
Figure 8B:
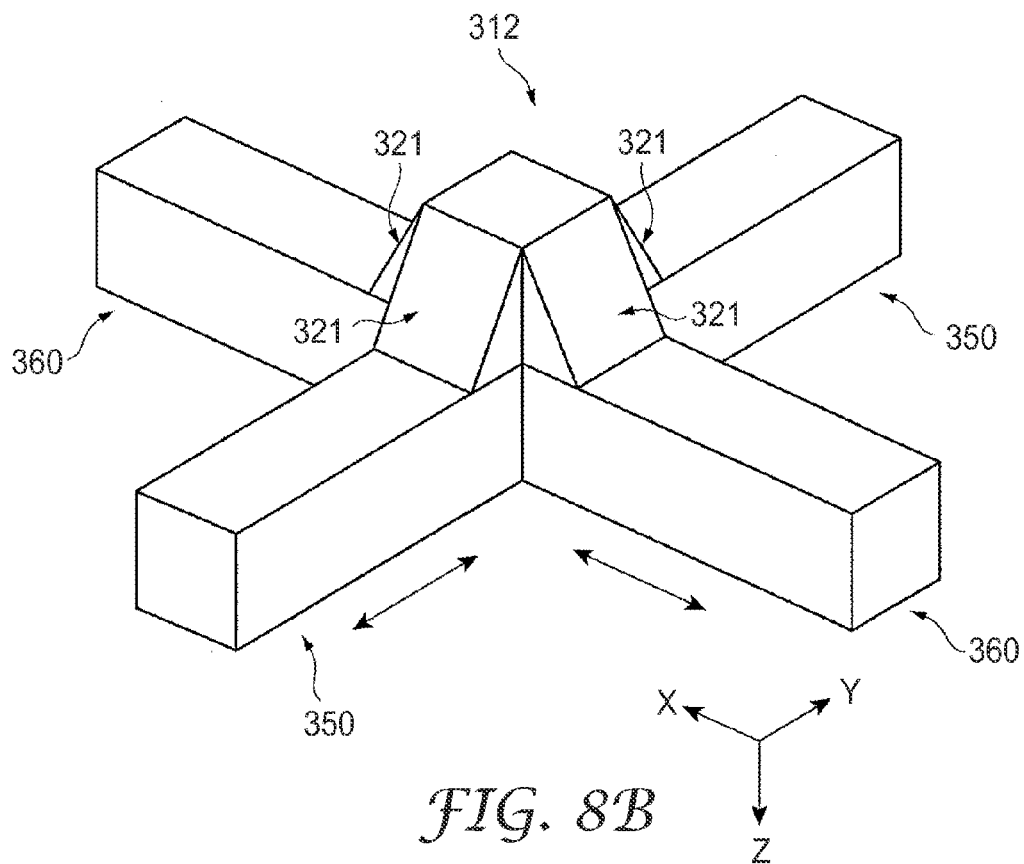
FIG. 8B is a perspective view illustrating a mold structure for producing the locking member illustrated in FIG. 8A.
Figure 9A:
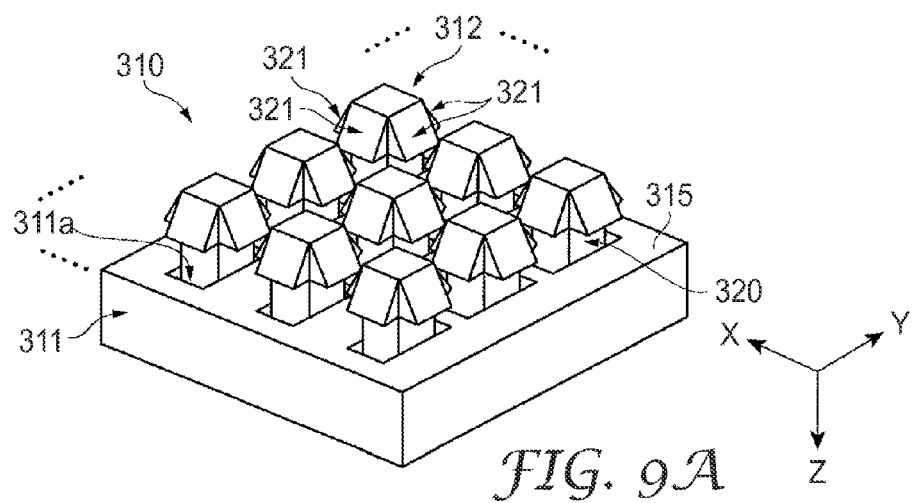
FIG. 9A is a perspective view of the fastener member according to a comparative example.
Figure 9B:
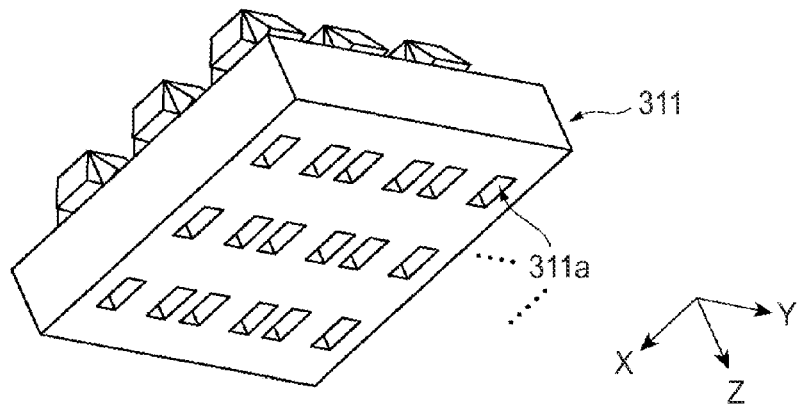
FIG. 9B is a perspective view illustrating a state of the fastener member illustrated in FIG. 9A from below.
Figure 9C:
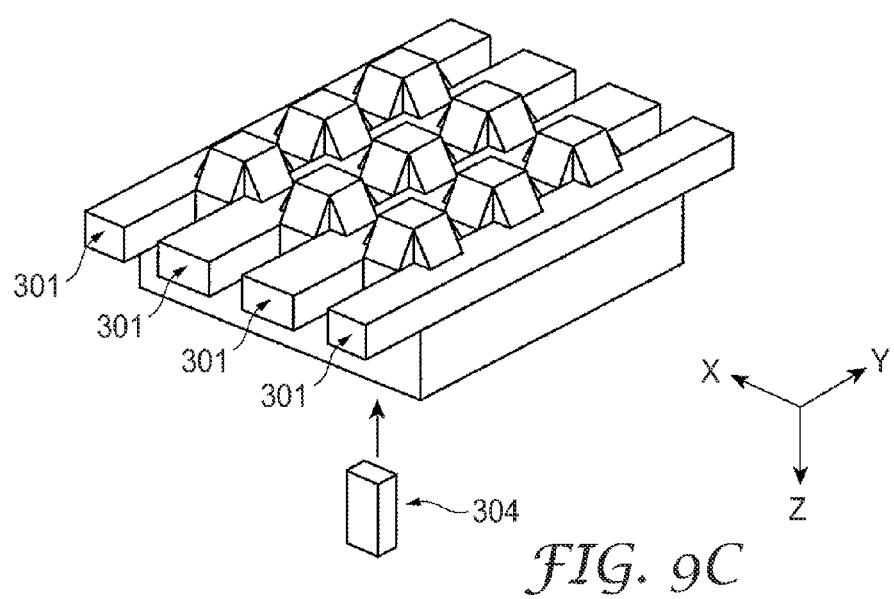
FIG. 9C is a perspective view illustrating a mold structure for producing the locking members of the fastener member illustrated in FIG. 9A.

Next, a locking member 312 of the fastener member 310 illustrated in FIGS. 8 and 9 is provided with, as illustrated in FIG. 8A, a barbed portion 321 that extends only in the X direction from the side face 322 that opposes the X direction of the shaft portion 320 and a barbed portion 321 that extends only in the Y direction from the side face 323 that opposes the Y direction. By this, the range that enables the loop yarn 31 of the loop member 30 to be hooked can be widened, but the following problems are generated in this configuration. Specifically, as illustrated in FIG. 8B, in order to form the undercut portion relative to the barbed portion 321 that extends in the X direction and the undercut portion relative to the barbed portion 321 that extends in the Y direction, slide molds are required for two directions. For example, a slide mold 350 that moves in the Y direction is required for the barbed portion 321 that extends in the Y direction, and a slide mold 360 the moves in the X direction is required for the barbed portion 321 that extends in the X direction. When adopting this type of method, production costs increase. Further, because the locking members 321 cannot be disposed in positions where slide molds 350 and 360 pass through, high density molding of the locking members 312 is affected.

Or, in the method illustrated in FIG. 9, the undercut portion of the barbed portion 321 that extends in the X direction uses a slide mold 301 that slides in the Y direction, and the undercut portion of the barbed portion 321 that extends in the Y direction uses a mold 304 that pushes up from below. When adopting this type of method, as illustrated in FIGS. 9A and 9B, it becomes necessary to form through holes 311a in the base portion 311 itself in order for the mold 304 to pass through. Forming the through holes 311a lowers adhesive force with other members on the back surface (functions as an adhesive surface with other members) side of the base portion 311 and also lowers rigidity of the fastener member. Further, high density forming of the locking members 312 is also affected due to securing space for the through holes 311a to prevent coming too close to the through holes 311a.

Meanwhile, with the fastener member 10 according to this embodiment, the barbed portions 21 provided on the side faces 22A and 22B that oppose in the X direction of the shaft portion 20 extend in directions intersecting the X direction and the Y direction as viewed in the Z direction. In this way, because both the X direction component and the Y direction component are included in the directions that the barbed portions 21 extend, the range in which the loop yarn 31 of the loop member 30 can be hooked can be widened compared to the locking members 212 illustrated in FIG. 7. By doing so, it is easier for each single locking member to lock with the loop yarn 31, and because the locking members 12 that lock with the loop yarn 31 in the fastener member 10 can be increased, the coupling force with the loop member 30 for the overall fastener member 10 can be improved. Further, because the barbed portions 21 have directional components of both the X direction and the Y direction, coupling can be securely performed regardless of the orientation of the loop yarn 31 of the loop member 30.

Further, even if the barbed portions 21 have a directional component of both the X direction and the Y direction, because it extends from the side faces 22A and 22B opposing the X direction, a slide mold that moves in the Y direction can be used to form the side faces 22A and 22B (the side faces 22A and 22B in the base end region 22a) at the same time. In this way, a multidirectional slide mold is not required, and by using only a slide mold that moves in the Y direction, the undercut portion UE can be formed having a portion submerged to the inner side as viewed in the Y direction (direction illustrated in FIG. 4) relative to the barbed portions 21 as well as a submerged portion SE submerged more to the inner side as viewed in the X direction (state illustrated in FIG. 3) at the same time. Because production is possible with only one slide direction in this manner, the production process can be made easier, production costs can be reduced, and production speed can be improved. Moreover, because a multi-directional slide mold and/or through holes in the base portion 11 required in the production of the locking members 312 illustrated in FIGS. 8 and 9 are not necessary, there can be fewer restrictions for arranging the locking members 12 and the locking members 12 can be disposed in high density on the surface 15 of the base portion 11. Therefore, the coupling force with the loop member 30 can be further improved.

Further, because simple injection molding can be adopted using only a one directional slide mold instead of any other complex molding method to produce this type of high performance fastener member 10, production costs can be cheaper. According to the above, the fastener member 10 can be produced in a simple production process and can improve the coupling force with a subject to be coupled.

Further, with the fastener member 10 according to this embodiment, the barbed portions 21 can be provided in a plurality on the side faces 22A and 22B. Increasing the barbed portions 21 having directional components of both the X direction and the Y direction in this manner enables the coupling force of the loop member 30 to be further improved.

Further, in the fastener member 10 according to this embodiment, the recess 26 for hooking the loop yarn 31 of the loop member 30 is provided on the surface 15 side of the barbed portions 21. By this, the loop yarn 31 of the loop member 30 easily hooks on the barbed portions 21 and can be firmly held even after being hooked. By this, the coupling force can be further improved.

Further, in the fastener member 10 according to this embodiment, the locking members 12 are disposed in a lattice-like manner as viewed in the Z direction. By this, the locking members 12 can be disposed in high density on the surface 15 of the base portion 11, and the coupling force with the loop member 30 can be further improved.

Further, in the fastener member 10 according to this embodiment, the barbed portions 21 have a portion that extends further in the Y direction than the shaft portion 20 as viewed in the Z direction. By this, the loop yarn 31 that resides on the Y direction outer side of the shaft portion 20 can be hooked.

Further, in the fastener member 10 according to this embodiment, each of the barbed portions 21 provided on the pair of side faces 22A and 22B is provided so as to be symmetrical around the shaft portion 20. By this, the loop yarn 31 that resides on the side face 22A side as well as the loop yarn 31 that resides on the side face 22B can hook onto the barbed portions 21 in a similar manner. Therefore, a stable coupling force can be improved.

Descriptions are given above of favorable embodiments of the present invention, however, the present invention is not limited to the embodiments given above and may be modified or applied to other applications within a scope that does not change the elements described in the claims.

The shape of the barbed portions as viewed in the Z direction may be set in any manner as long as it can be formed by the mold. For example, the direction that the barbed portions extend does not have to be linear but may also extend in a curved shape as long as the directional components of both the X direction and the Y direction are included. For example, in the locking member 40 illustrated in FIG. 1 OA, the barbed portions 41 extend in a curved shape from the side faces 22A and 22B of the shaft portion 20 toward the outer side of the shaft portion 20. By this, both end faces of the barbed portions 41 have a curved surface that curves to the outer side.

Figure 10A:
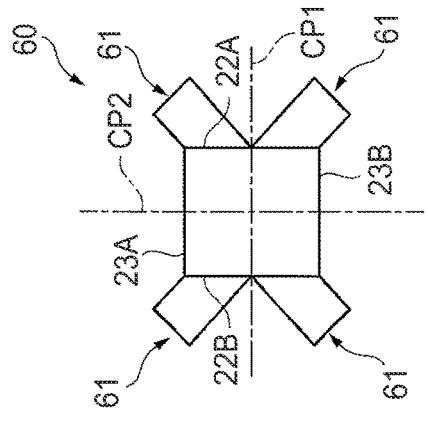
FIGS. 10A-10E illustrate various configurations of the locking members of the fastener member according to modified examples as viewed in the Z direction.
Figure 10B:
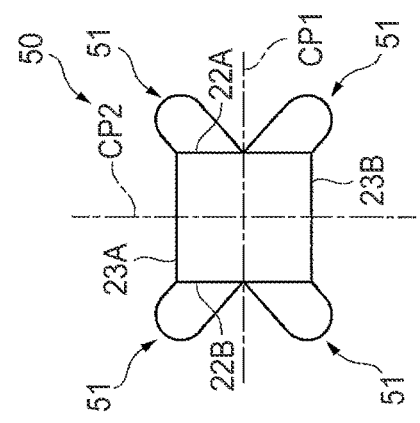
Figure 10C:
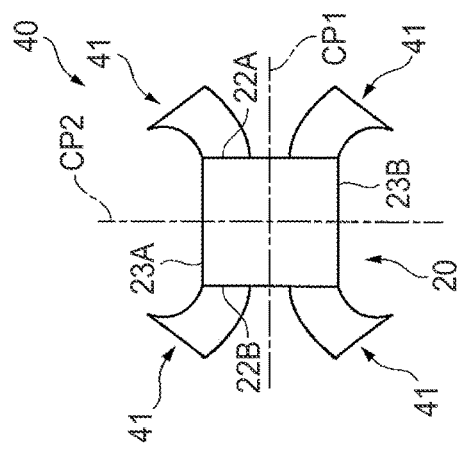
Figure 10D:
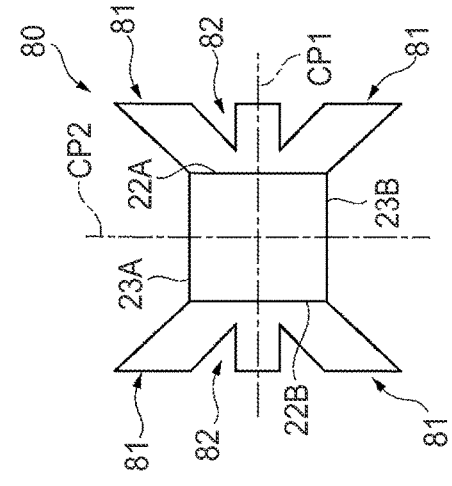

Further, the shape of the end portion of the barbed portion also does not have to have a straight shape in the Y direction as described in the above embodiment, but any shape may be used. For example, in the locking members 50 illustrated in FIG. 10B, the end portions of the barbed portions 51 are rounded to form an R shape. Further, in the locking member 60 illustrated in FIG. 10C, the end portions are shaped so as to be orthogonal to the direction that the barbed portions 61 extend.

Figure 10E:
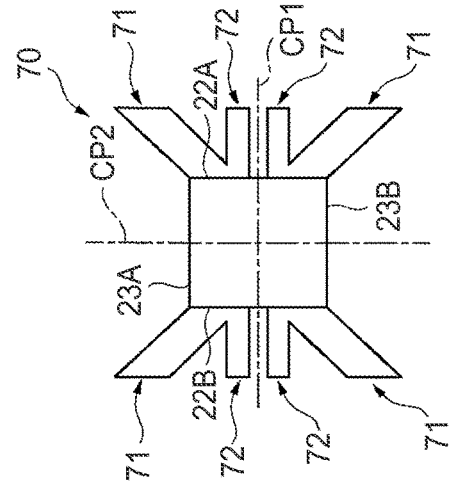

Further, the number of barbed portions 21 formed on the side faces 22A and 22B is not particularly limited and three or more barbed portions 21 may be provided or only one barbed portion 21 may be provided. Note that when providing a plurality of barbed portions 21, a portion of the barbed portions may include only the directional component in the X direction. For example, in the locking member 70 illustrated in FIG. 1 OD, three or more barbed portions 71 and 72 are formed on the side faces 22A and 22B. Further, the locking member 70 also has the barbed portion 72 that includes only the directional component in the X direction in addition to the barbed portion 71 that includes the directional components of both the X direction and the Y direction. Note that one barbed portion 71 and one barbed portion 72 are in a mutually coupled state near the side faces 22A and 22B. Further, in the locking member 80 illustrated in FIG. 10E, three barbed portions 81 and 82 are formed on the side faces 22A and 22B. Further, the locking member 80 also has the barbed portion 82 that includes only the directional component in the X direction in addition to the barbed portion 81 that includes the directional components of both the X direction and the Y direction. Note that a pair of barbed portions 81 and one barbed portion 82 are in a mutually coupled state near the side faces 22A and 22B.

Further, the shape of the tip end side of the locking member may be set in any manner as long as it can be formed by the mold. For example, in the locking member 170 illustrated in FIG. 11A, forming a large R shape between the shaft portion 172 and the barbed portion 171 allows the tip end portion 173 to have a rounded shape. Further, in the locking member 180 illustrated in FIG. 11B, extending inclined faces of the outer side of the barbed portion 181 as is and joining at the tip end makes the tip end portion 183 be a pointed shape without the shaft portion 182 having a flat tip end face.

Further, the recess formed in the undercut portion of the barbed portion may be set in any manner as long as it can be formed by the slide mold. For example, in the locking member 130 illustrated in FIG. 11C, a recess 134 rounded relative to the barbed portion 131 is formed. Further, in the locking member 140 illustrated in FIG. 11D, a recess 144 is formed such that the entire undercut portion of the barbed portion 141 becomes an inclined face. Further, in the locking member 150 illustrated in FIG. 11E, a recess 154 is formed such that the entire region near the shaft portion 152 becomes an inclined face of the undercut portion of the barbed portion 151.

Any size, width, or shape for the barbed portion may be set as long as it can be formed by the mold, but providing a small width and/or thickness per single barbed portion and forming as many as possible on the side face of the shaft portion is effective as the loop yarn becomes more easily hooked. Meanwhile, the barbed portion is set to a width and thickness sufficient to secure the required strength to hold the hooked loop member. Note that when adopting a material having high strength for the barbed portion, a rod-like member provided on the shaft portion 162, such as the locking member 160 illustrated in FIG. 11F, may be used as the barbed portion 161.

Figure 12A:
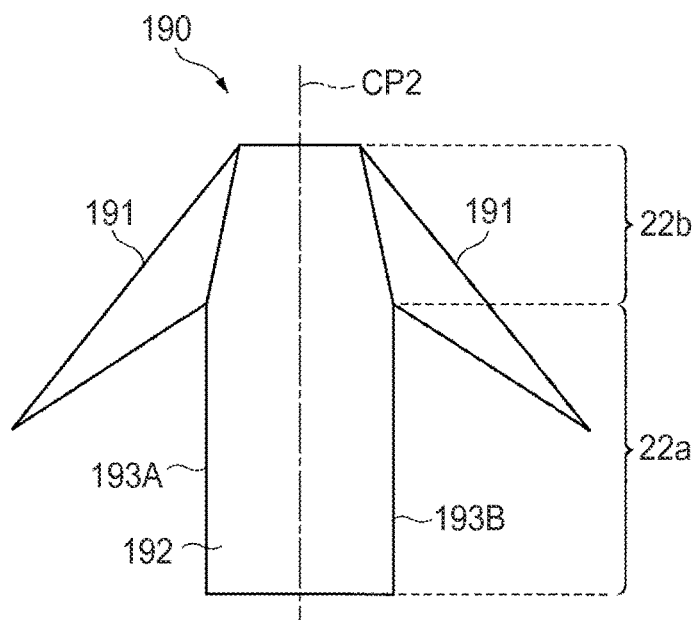
FIG. 12A illustrates a configuration of the locking members of the fastener member according to a modified example as viewed in the Y direction.
Figure 12B:
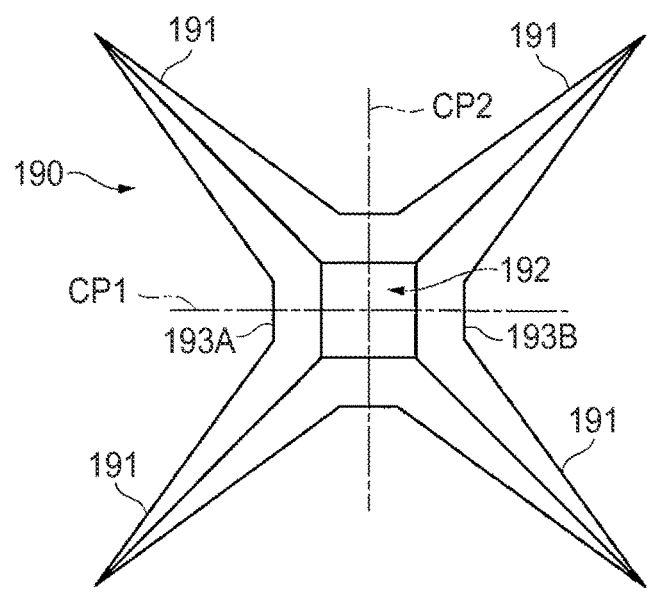
FIG. 12B is a drawing illustrating a configuration as viewed in the Z direction.

Further, the shape of the side face of the shaft portion is also not particularly limited. For example, in the locking member 190 illustrated in FIG. 12, side faces 193A and 193B of the shaft portion 192 are inclined relative to the reference plane CP2 in the tip end region 22b. Further, the tip end side region 22b is disposed more to the inner side relative to the reference plane CP2 than the base end region 22a.

Note that, of the side faces that oppose the X direction of the shaft portion, only any one of the side faces may have barbed portions that extend in directions intersecting the X direction and the Y direction. Further, of the plurality of locking members of the fastener member, only a portion of the locking members may have barbed portions that extend in directions intersecting the X direction and the Y direction.

Further, in the above embodiment, the fastener member 10 is for a vehicle interior, but the use of the fastener member 10 is not limited. The fastener member 10 may be applied to coupling in various fields and can be provided for use in, for example, the affixing of other members such as seats in a vehicle, affixing building materials, affixing a mat, affixing fabric on a chair, holding a curtain, affixing display items such as a display panel, affixing a supporter, and affixing nursing care equipment.

Further, the fastener member of the above embodiment couples with a loop member 30 as the subject to be coupled, but the subject to be coupled is not limited. The subject to be coupled of the fastener member 10 may be, for example, another loop member different from the loop member 30 or it may be a hook member having a similar structure to that of the fastener member 10.

What is claimed is:

1. A fastener member comprising: a base portion having a surface; and a plurality of locking members vertically provided on the surface, the locking members locking with a subject to be coupled so as to mechanically couple to the subject to be coupled;

the locking member including:

a shaft portion, projecting from the base portion, having a pair of side faces that are opposite each other in a first direction and, as viewed from the surface, each face extending in a second direction orthogonal to the first direction; and a barbed portion provided on each of the pair of side faces; and as viewed from the surface, the barbed portion provided on at least one of the side faces of the pair of side faces extending in a third direction non-parallel to each of the first direction and the second direction; and wherein a plurality of the barbed portions is provided on at least one of the side faces.

2. The fastener member according to claim 1, wherein a recess for hooking the subject to be coupled is formed on the surface side of each of the barbed portions.

3. The fastener member according to claim 2, wherein as viewed from the surface, (a) the locking members are disposed in a lattice-like manner, (b) each of the barbed portions includes a portion extending farther in the second direction than the shaft portion, or both (a) and (b).

4. The fastener member according to claim 3, wherein each of the barbed portions provided on the pair of side faces is provided so as to be symmetrical around the shaft portion.

5. The fastener member according to claim 2, wherein each of the barbed portions provided on the pair of side faces is provided so as to be symmetrical around the shaft portion.

6. The fastener member according to claim 1, wherein, as viewed from the surface, the locking members are disposed in a lattice-like manner.

7. The fastener member according to claim 6, wherein, as viewed from the surface, each of the barbed portions includes a portion extending farther in the second direction than the shaft portion.

8. The fastener member according to claim 6, wherein each of the barbed portions provided on the pair of side faces is provided so as to be symmetrical around the shaft portion.

9. The fastener member according to claim 1, wherein, as viewed from the surface, each of the barbed portions includes a portion extending farther in the second direction than the shaft portion.

10. The fastener member according to claim 9, wherein each of the barbed portions provided on the pair of side faces is provided so as to be symmetrical around the shaft portion.

11. The fastener member according to claim 1, wherein each of the barbed portions provided on the pair of side faces is provided so as to be symmetrical around the shaft portion.

12. The fastener member according to claim 1, wherein a recess for hooking the subject to be coupled is formed on the surface side of each of the barbed portions.

13. The fastener member according to claim 12, wherein as viewed from the surface, (a) the locking members are disposed in a lattice-like manner, (b) each of the barbed portions includes a portion extending farther in the second direction than the shaft portion, or both (a) and (b).

14. The fastener member according to claim 12, wherein each of the barbed portions provided on the pair of side faces is provided so as to be symmetrical around the shaft portion.

15. The fastener member according to claim 1, wherein as viewed from the surface, (a) the locking members are disposed in a lattice-like manner, (b) each of the barbed portions includes a portion extending farther in the second direction than the shaft portion, or both (a) and (b).

16. The fastener member according to claim 15, wherein each of the barbed portions provided on the pair of side faces is provided so as to be symmetrical around the shaft portion.

17. The fastener member according to claim 1, wherein each of the barbed portions provided on the pair of side faces is provided so as to be symmetrical around the shaft portion.

18. The fastener member according to claim 1, wherein the extension direction of each of the barbed portions provided on at least one of the side faces of the pair of side faces is configured of directional components of both the first direction and the second direction.

19. The fastener member according to claim 1, wherein each of the barbed portions provided on at least one of the side faces of the pair of side faces extends so as to widen to an outer side from the shaft portion as the barbed portion approaches the surface.

* * * * *